United States Patent [19]
Olmsted

[11] Patent Number: 4,586,095
[45] Date of Patent: Apr. 29, 1986

[54] FAIL-SAFE LOCKING MECHANISM FOR TAPE CARTRIDGE DRIVE WITH MOVABLE READ/WRITE HEAD

[75] Inventor: Dennis R. Olmsted, San Diego, Calif.
[73] Assignee: Data Electronics, Inc., San Diego, Calif.
[21] Appl. No.: 444,833
[22] Filed: Nov. 26, 1982
[51] Int. Cl.$^4$ .................... G11B 5/008; G11B 15/00; G11B 17/00
[52] U.S. Cl. ...................................... 360/93; 360/96.5
[58] Field of Search ................. 360/83, 85, 93, 95, 360/96.1-96.6, 105, 60

[56] References Cited
U.S. PATENT DOCUMENTS 3,665,114  5/1972  Hathaway ........................... 360/85
4,130,848 12/1978  Amano ................................ 360/93

Primary Examiner—A. J. Heinz
Attorney, Agent, or Firm—Christie, Parker & Hale

[57] ABSTRACT

A tape cartridge drive having a movable read/write head has a fail-safe locking mechanism for preventing removal of the cartridge when the head is in contact with the tape. The tape cartridge has a door on the cartridge housing for opening to expose a portion of the tape prior to moving the head into contact with the tape. The cartridge door has a tripping arm which is rotated for opening the cartridge door. The door of the tape drive has a cam that contacts an interposer latch inside the tape drive housing for rotating the tripping arm to open the cartridge door when the door of the tape drive is closed. A pawl latch locks the door of the tape drive and a head moving mechanism moves the head to its operative position. During the first portion of the head movement, a locking pin is placed behind the interposer latch. This locks the latch in position to prevent the possible ejection of the cartridge while the head is in contact with the tape. If the door to the tape drive is accidentally opened, the locking pin provides a restraining force that keeps the cartridge in place in the housing.

13 Claims, 6 Drawing Figures

FAIL-SAFE LOCKING MECHANISM FOR TAPE CARTRIDGE DRIVE WITH MOVABLE READ/WRITE HEAD

BACKGROUND OF THE INVENTION

1. Field of the Invention

This invention relates to magnetic tape drives; and more particularly, to a tape cartridge drive with a movable read/write head.

2. Description of the Prior Art

In recent years, computer technology has greatly expanded the market for computers, including reasonably inexpensive small computers, such as personal computers and computers for small businesses. The so-called floppy disk drives provide a common means of data storage for small computers. One floppy disk drive in common use today is the industry standard 5¼ inch minifloppy disk drive. One or more of these disk drives are typically mounted inside the computer console. A diskette is inserted or removed through one or more slots in the front of the console. In other applications, the minifloppy disk drive is contained in a separate housing for use externally to the computer console. In either instance, it has become an industry practice to provide a 5¼ inch minifloppy disk drive as a package with standard exterior dimensions.

Floppy disk drives have proved to be convenient for many applications, such as program loading and data interchange, but they have a limited data storage capacity. Because of this problem, larger capacity disk drives, such as the so-called Winchester disk drives, have been used in lieu of floppy disk drives in applications requiring greater data storage capacities. The Winchester-type disk drive generally comprises one, two, or three hard disks on which data are recorded. A Winchester-type disk drive can provide a much higher data storage capacity and faster data access and data transfer times than a floppy disk drive. Accordingly, a common practice in small business applications is to use a combination of the minifloppy disk and the Winchester disk. In this way, the day's transactions can be recorded on one or two floppy disks, and a full copy of the business's transactions can be made on a hard disk at weekly intervals or longer.

Recently, Winchester-type disk drives have been manufactured in a package with the same exterior dimensions and mounting hole locations as a standard 5¼ inch minifloppy disk drive. In this way, the Winchester disk drive can be conveniently installed in the computer console in place of a minifloppy disk drive to provide the larger data storage capacity.

Data storage for computer applications also can be provided by magnetic tape drives instead of disk drives. In recent years, ¼-inch cartridge tape drives have been replacing floppy disk drives in many applications because the tape cartridges are more compact, they can store from about 15 to 50 times more data than diskettes, and they have a lower cost per megabyte.

Tape cartridges, such as the Scotch DC 300XL data cartridge made by 3M Co., are commonly used for data storage in cartridge drives. Briefly, this type of standard tape cartridge includes a ¼-inch magnetic tape enclosed within a case. The tape is driven, in part, by an internal capstan, a portion of which is exposed at an edge of the cartridge case. When the cartridge is inserted into a receptacle in the tape drive unit, the exposed capstan engages a capstan driven by the tape drive motor for driving the tape. The tape cartridge also includes a door near a corner of the case. The cartridge door is normally springbiased to a closed position for protecting the tape during storage and transport. When the cartridge is inserted in the tape drive unit, the door is tripped open to expose a portion of the tape for engaging the magnetic read/write head on the tape drive unit. The head projects into the cartridge envelope to contact the tape under the proper operating tension. The mechanism for guiding the cartridge into the receptacle not only trips the door open, but it also prevents the door from contacting the read/write head when the cartridge is inserted or removed.

The magnetic tape cartridges used in magnetic tape drives are manufactured according to industry standards approved by the American National Standards Institute (ANSI), Magnetic tape drives, including the larger ½-inch tape drives, have been able to replace the industry standard larger disk drives, such as the 8-inch, 10½ inch and 14-inch disk drives. However, the standard ¼-inch tape drive units have not been able to replace either the 5¼ inch minifloppy disk drive or the Winchester-type disk drive, because the ANSI standard size ¼-inch tape cartridge has been too large to fit into a tape drive unit that meets the industry standard exterior dimensions of the 5¼ inch disk drives. For instance, the standard exterior width of a 5¼ inch disk drive package is 5.75 inches. With the ANSI standard size tape cartridge inserted in a standard tape drive, and with the cartridge door held open to expose the tape, the cartridge case and the cartridge door in its open position cover a distance of 5.765 inches, i.e., a distance greater than the standard 5.75-inch width of the smaller disk drives.

The present invention provides a magnetic tape drive that allows an ANSI standard tape cartridge to be inserted into a tape drive package having the same industry standard exterior dimensions as the 5¼ inch disk drives.

The ANSI standard exterior dimensions of a ¼-inch tape cartridge are 4 inches by 6 inches (when the cartridge door is closed). U.S. Pat. No. 4,498,112, issued Feb. 5, 1985, entitled "Tape Cartridge Receptacle", discloses a tape drive unit which allows a ¼-inch tape cartridge to be inserted into a tape drive housing having the same exterior dimensions as the 5¼ inch disk drives. In that tape drive unit, the cartridge is front-loaded into the receptacle, i.e., the cartridge is inserted with its long dimension facing the mounting slot on the front wall of the tape drive housing. The amount of space taken up by this tape drive unit adjacent a computer console can be reduced if the tape drive housing is turned 90° so its short dimension (the end face of the unit) faces forward adjacent the computer console. This would require loading the cartridge into the tape drive unit endwise, i.e., inserting the cartridge lengthwise with its short dimension facing a shorter mounting slot in the end wall of the housing. However, if the tape cartridge is loaded endwise, the read/write head would normally interfere with sliding the cartridge case into the tape drive unit. The head would be in the way in this instance because it normally protrudes into the tape cartridge envelope.

The present invention provides a tape drive unit with a movable read/write head which allows a tape cartridge to be inserted endwise into the housing and removed from the housing without interference with the read/write head. Once the tape cartridge is in place in the unit, the read/write head is moved into an operating position for applying the proper operating tension to the tape. The head is retracted prior to removing the cartridge from the tape drive housing.

When inserting the tape cartridge endwise into the tape drive housing, there is a need to ensure that the read/write head is not moved into the operating position until the tape cartridge is fully inserted into the unit and the cartridge door is held open. There is also a need to ensure that the cartridge cannot be removed from the housing while the head is in its operating position. The head must be fully retracted before the cartridge can be removed.

The present invention provides a fail-safe mechanism that cooperates with the movable read/write head to permit the cartridge to be fully inserted into the tape drive unit with the cartridge door held open before the head is moved to its operating position. The fail-safe mechanism also prevents removal of the cartridge if the head is in its operating position, and the cartridge cannot be removed from the tape drive unit until the head is fully retracted.

SUMMARY OF THE INVENTION

Briefly, the present invention provides a failsafe mechanism for preventing ejection of a tape cartridge from a receptacle in a tape drive when a read/write head is in contact with a tape in the tape cartridge. In one embodiment, the invention includes a latch in the receptacle of the tape drive for moving into an operative position in contact with the cartridge door tripping arm when the cartridge is positioned in the tape drive receptacle. The latch is moved into its operative position in contact with the cartridge door tripping arm for opening the cartridge door to expose the tape for its contact with the head. A rigid locking pin engages the latch in its operative position to hold the latch in a fixed position maintaining contact with the cartridge door tripping arm to hold the cartridge door open. The fixed rigid locking pin holds the latch so as to apply pressure to the cartridge door tripping arm to provide a restraining force that prevents ejection of the cartridge from the tape drive receptacle.

In one embodiment, the locking pin is carried on a movable support for the read/write head which is held in a retracted position while the cartridge is inserted into the tape drive receptacle. The head then moves into its operative position in contact with the tape while moving the locking pin to its fixed position to hold the restraining force on the tape cartridge and prevent any interference between the tape head and the cartridge.

These and other aspects of the invention will be more fully understood by referring to the following detailed description and the accompanying drawings.

DRAWINGS

DETAILED DESCRIPTION

Figure 1:
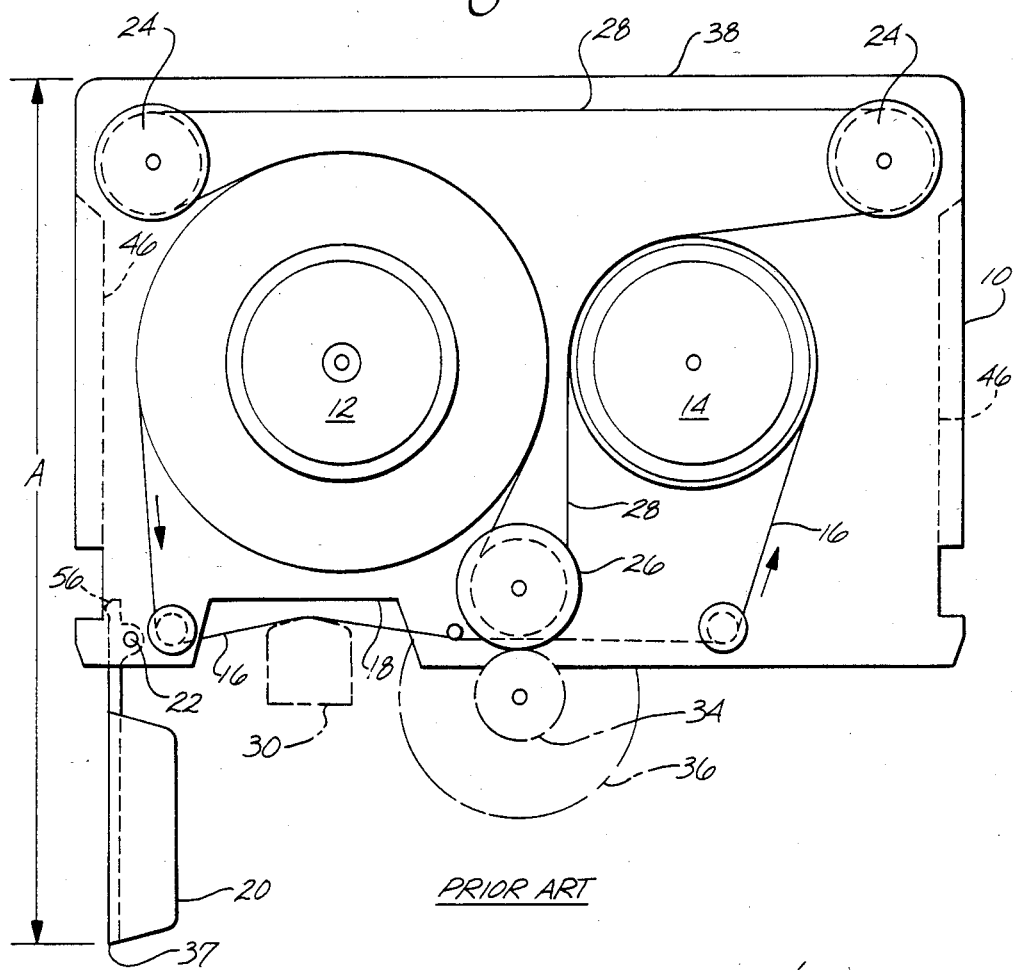
FIG. 1 is a semi-schematic top plan view illustrating a standard magnetic tape cartridge inserted in a tape drive unit with the cartridge door in its fully open position to expose the tape for contact with a magnetic read/write head.

FIG. 1 illustrates a standard tape cartridge used in a tape drive unit of this invention. Portions of the tape drive unit are illustrated in phantom lines. The tape cartridge includes a housing 10 containing a pair of tape reels, i.e., a supply hub 12 and a take-up hub 14. A magnetic recording tape 16 wound on both reels passes from one reel to the other. The tape passes through a recessed opening 18 in an edge of the tape cartridge housing. A door 20 is mounted to pivot on a pivot pin 22 at a corner of the housing. The door mechanism has a return spring (not shown) that normally closes the door over the portion of the tape exposed in the recess 18. Other portions of the tape cartridge include a pair of belt guide rollers 24 and a belt drive capstan 26 around which a flat drive belt 28 is wound. When the tape cartridge is inserted into a conventional tape cartridge receptacle, the door 20 is immediately tripped open and retained in its open position to expose a portion of the tape 16 in the recess 18. The exposed portion of tape is engaged by a magentic read/write head 30 of the tape drive unit. The cartridge door is shown in its fully open position in FIG. 1. When the cartridge is locked in place in the tape drive unit, a drive capstan 34 on the tape drive motor 36 engages the belt drive capstan 26 for driving the tape in the direction of the arrows shown in FIG. 1.

ANSI standards control, among other things, the width of the tape cartridge housing, the location and dimensions of the recess 18, and the location and dimensions of the door 20. This, in effect, controls the maximum width of the cartridge when the door is held in its fully open position during use. The standard distance from the tip 37 of the door in its fully opened position to the trailing edge 38 of the cartridge, as illustrated by the dimension A in FIG. 1, is 5.765 inches. As explained above, this distance is greater than the standard width of the disk drive package for the standard 5¼ inch minifloppy disk or the 5¼ inch Winchester-type disk drive.

Figure 2:
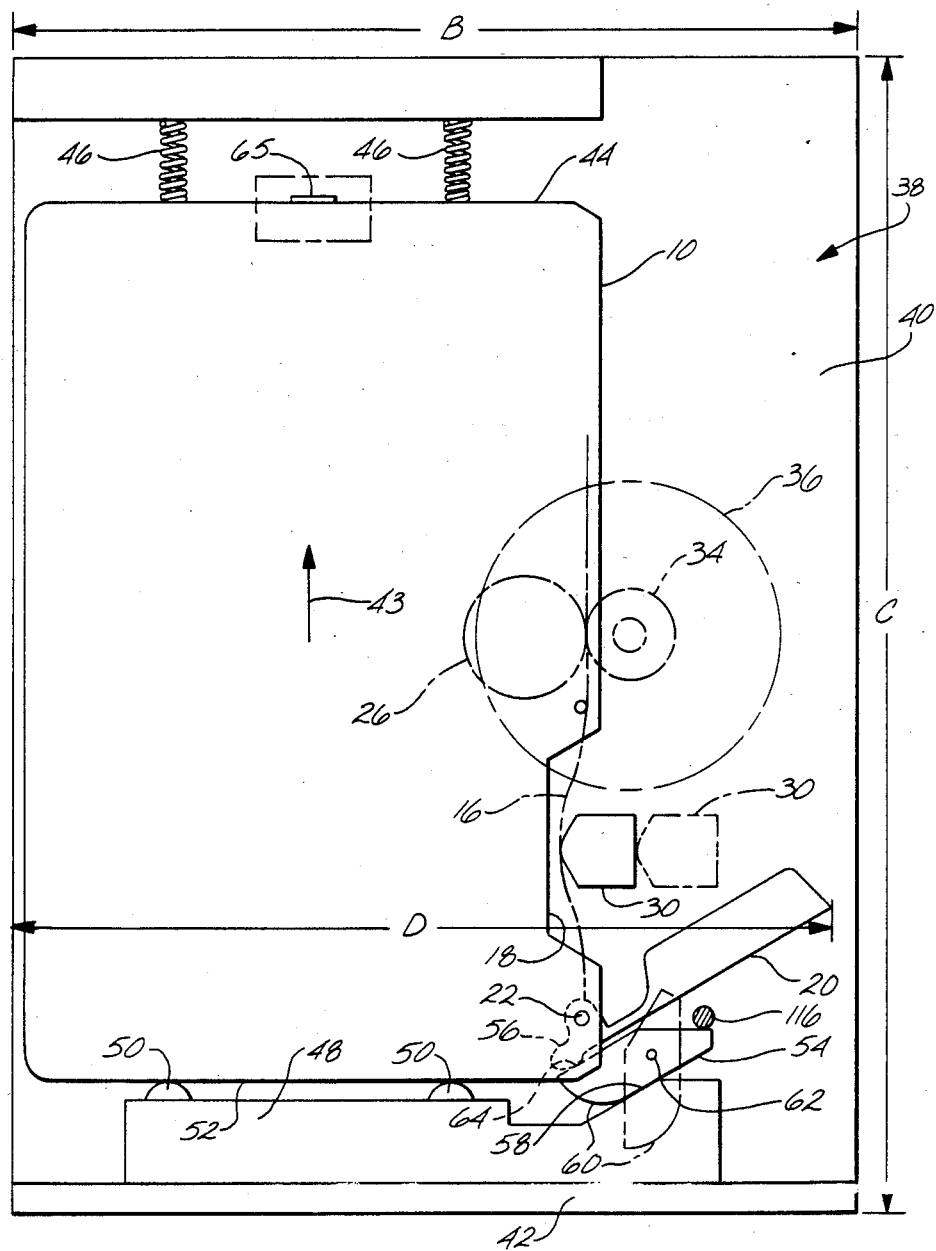
FIG. 2 is a semi-schematic top plan view illustrating the tape cartridge inserted in the tape drive unit with the cartridge door held partially open so the exposed portion of the tape can be engaged by the movable read/write head of this invention.

FIG. 2 is a semi-schematic top plan view illustrating the standard tape cartridge inserted in a tape drive unit according to principles of this invention. The tape drive unit has a receptacle 38 for receiving the tape cartridge. The receptacle is formed with a rectangular base plate 40 having a maximum width B or 5.75 inches and a maximum length C of 8.00 inches. These dimensions are the maximum dimensions of the tape drive unit of this invention, and these dimensions are the same as those for a standard 5¼ inch floppy disk drive and a 5¼ inch Winchester-type disk drive. The tape drive unit has a door 42 extending along the short dimension B of the tape drive unit. When the door is opened, the cartridge is inserted into the receptacle endwise, i.e., lengthwise along the long dimension of the cartridge, as illustrated by the arrow 43. Guide rails (not shown) can be provided along opposite edges of cartridge travel into the receptacle. When the cartridge is inserted, the guide rails can contact opposite sides of the cartridge case to provide means for guiding the sliding movement of the cartridge toward and away from a locked position adjacent the read/write head 30. FIG. 2 illustrates the retracted position of the read/write head 30 in phantom lines. In its retracted position, the read/write head is spaced from the envelope of the tape cartridge so that it does not interfere with sliding the cartridge into the receptacle. The head is shown in solid lines in its operative position applying tension to the tape.

A rear face 44 of the cartridge case is moved against the bias of one or more ejection springs 46 at the rear of the receptacle. After the cartridge is slid most of the way into the receptacle, the cartridge door 20 is closed. The inside face of the door carries a cartridge position control block 48 having one or more nubs 50 for engaging a front face 52 of the cartridge. As the door is closed, the nubs push the cartridge into the receptacle to its stored position.

As the door 42 of the tape drive is being closed, an interposer latch 54 inside the cartridge receptacle opens the receptacle door 20 for exposing the tape 16. The door of a standard tape cartridge has a door control arm 56 which extends to the side of the door pivot pin 22 opposite the cartridge door 20. The interposer latch 54 is engaged by a ramp-shaped cam 58 on the door control block 48. As the door of the tape drive is being closed, the cam 58 engages a curved follower edge 60 on the interposer latch to pivot the latch about a pivot pin 62. The interposer latch has a cartridge door control surface 64 on a side of the pivot axis opposite the follower edge 60. The cam 58 on the door 42 engages the follower edge 60 of the latch to progressively pivot the latch through an arc (clockwise in FIG. 2) which, in turn, moves the control surface 64 of the latch into contact with the cartridge door control arm 56. Thus, as the door of the tape drive is progressively rotated into its closed position, the interposer latch progressively rides down along cam 58 to progressively force the control surface 64 of the latch against the cartridge door-tripping arm 56. This opens the cartridge door 20 by rotating it in a clockwise direction (as viewed in FIG. 2) about the pin 22. The cam 58 and the interposer latch 54 are arranged relative to the door control arm 56 so they cooperate to pivot the cartridge door to a partially open position illustrated in FIG. 2 when the cartridge reaches it stored position (with the tape drive door 42 closed).

When the cartridge is in the stored position, with the cartridge door in the partially open position as shown in FIG. 2, the overall width of the tape cartridge is reduced (compared with the prior practice of leaving the door fully open while the cartridge is in the locked position). The distance D between the tip of the door and the extreme edge of the receptacle base is about 5.6 inches. This distance is less than the standard 5.75-inch depth of the 5¼ inch floppy disk drive and the 5¼ inch Winchester-type disk drives. Thus, use of the tape drive of this invention makes it possible to use the standard ¼-inch tape cartridge in a tape drive unit having the same standard exterior dimensions as the 5¼ inch disk drives.

When the cartridge reaches the stored position and the door of the tape drive is locked, the rear face 44 of the cartridge case actuates a microswitch 65 near the rear of the tape drive receptacle. This closes the microswitch to power a drive motor 66 (see FIG. 5) for moving the magnetic read/write head 30 from its retracted position to the operative position shown in solid lines in FIG. 2.

Figure 3:
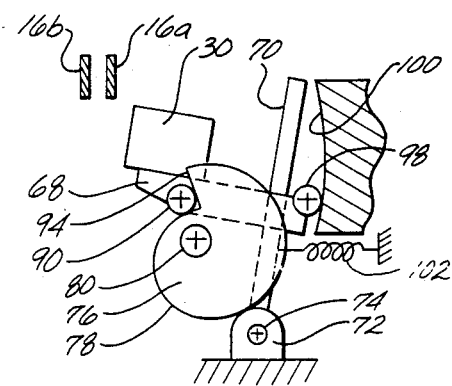
FIG. 3 is a schematic side elevation view illustrating the movable read/write head in its retracted position.
Figure 4:
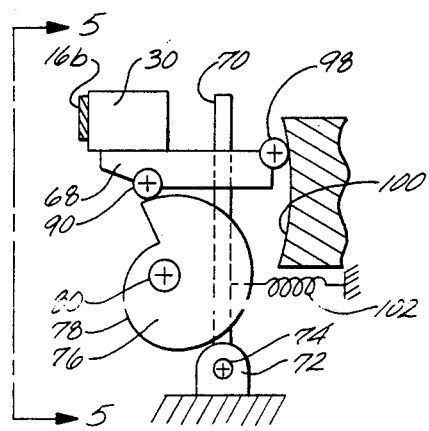
FIG. 4 is a schematic side elevation view illustrating the read/write head in its operative position.
Figure 5:
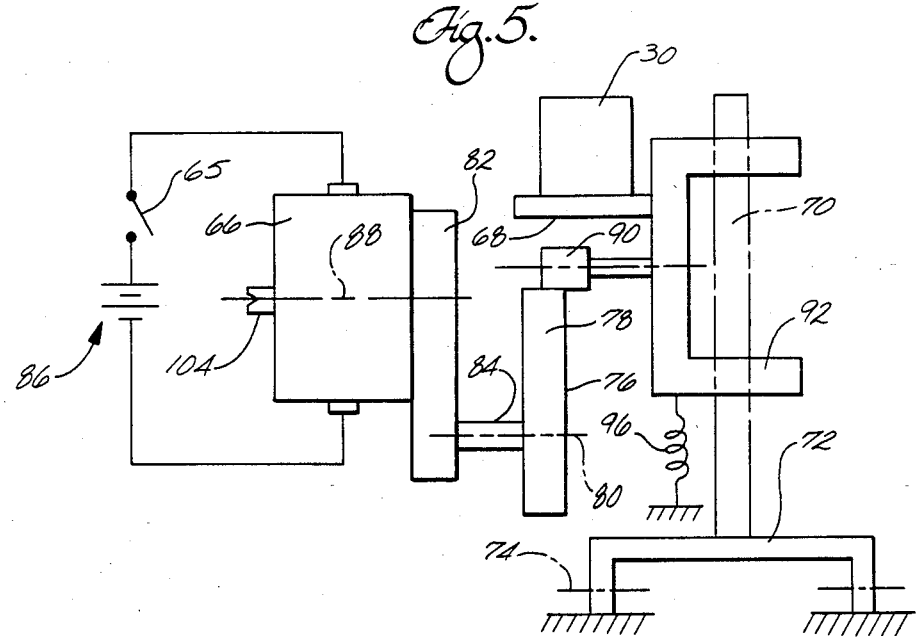
FIG. 5 is a schematic end elevation view taken on line 5—5 of FIG. 4.

The head-moving mechanism is understood best by referring to the schematic illustrations of FIGS. 3, 4, and 5. FIG. 3 schematically illustrates the magnetic read/write head in its retracted position, and FIG. 4 illustrates the head having been moved to the operative position. As illustrated in FIG. 3, the tape is in the position illustrated at 16a when the tape is in its normal or slack position. The tape moves to the position shown at 16b in FIGS. 3 and 4 when the head is moved to the operative position to apply the operative amount of tension to the tape. The read/write head is carried on a head support 68 which slides along a guide rod 70. An end of the guide rod is rigidly affixed to a pivoting frame 72. The frame pivots about a transverse axis at 74 so the guide rod, also referred to as a swing arm, can swing horizontally through an angle toward or away from the tape. In the retracted position of the head illustrated in FIG. 3, the swing arm has rotated away from the tape, and the head support 68 has moved along on the swing arm away from the elevation of the tape for holding the read/write head in a remote location spaced horizontally and spaced vertically from the tape. In the operative position illustrated in FIG. 4, the swing arm has rotated horizontally toward the tape, and the head support 68 has moved the head vertically along the swing arm into engagement with the tape.

The head support 68 is linked to the swing arm 70 through a rotatable cam 76 which causes the head support to slide back and forth along the cam. In the illustrated embodiment, the rotatable cam is formed as a disk with a curved cam surface 78. The cam surface 78 has a progressively larger radius of curvature (in the counterclockwise direction of rotation as viewed in FIG. 3) with respect to an eccentric axis of rotation 80 of the cam. As shown best in FIG. 5, the drive motor 66 has a gear housing 82 containing gear reduction coupled to an output shaft 84 for rotating the cam 76 about its axis 80. When the tape cartridge 10 is moved to its stored position, the microswitch 65 is closed to supply power from a power supply 86 to the drive motor. This rotates the motor about its axis 88, which, through the gear reduction 82, rotates the cam 76 about its eccentric axis 80. The drive motor is reversible, and when powered by closing of the microswitch 65, the drive motor rotates the cam 76 in the clockwise direction as viewed in FIG. 3. Rotation of the cam causes the head support 68 to slide vertically along the swing arm 70 toward or away from the tape 16. A first cam follower 90 engages the cam surface 78 of the rotatable cam. The first cam follower is carried on a shuttle 92 which slides along the length of the swing arm 70. The slidable head support 68 also is carried on the shuttle so that the read/write head 30 can slide along the swing arm in response to longitudinal travel of the shuttle. The cam has an abrupt radially extending edge 94 at the transition between the short radius portion and the long radius portion of the cam. In the retracted position of the head, the first cam follower 90 engages the short radius portion of the cam surface adjacent the radially extending edge 94. As the cam is rotated by the drive motor in the clockwise direction (as viewed in FIG. 3), the first cam follower 90 rides along the cam surface 78 of progressively longer radius to the position shown in FIG. 4. This movement of the cam follower causes the shuttle 92 to move along the swing arm 70 to carry the head support 68 and the read/write head 30 vertically toward the operative position shown in FIG. 4. The slide assembly is spring-biased by a spring 96, illustrated schematically in FIG. 5, for maintaining contact between the first cam follower 90 and the rotatable cam 76. The biasing spring 96 is shown biasing the head support 68 toward the cam although the spring can bias the shuttle is desired.

A second cam follower 98 engages a fixed cam 100 for controlling the lateral position of the head with respect to the tape. The second cam follower is carried on the head support 68. A biasing spring 102 biases the swing arm 70 toward the fixed cam 100. The surface of the fixed cam extends generally perpendicular to the length of the tape 16 and is spaced horizontally from the tape. The fixed cam surface extends vertically over a distance from the elevation of the tape to a point spaced vertically from the elevation of the tape. The swing arm 70 is free to rotate about its axis 74 as the second cam follower 98 moves along the fixed cam surface 100. When the second cam follower is engaged with the fixed cam at its remote position spaced vertically below the tape, the swing arm 70 has swung through an arc to the position shown in FIG. 3 in which the head is spaced both vertically and horizontally from the tape. The surface of the fixed cam 100 is curved inwardly toward the plane of the tape as the fixed cam surface approaches the tape vertically. Thus, as the second cam follower 98 moves vertically along the fixed cam toward the tape, the contact between the second cam follower and the fixed cam forces the head 30 to move horizontally toward the tape for applying tension to the tape when the head reaches the elevation of the tape. Thus, to move the head from the retracted position shown in FIG. 3 to the operative position shown in FIG. 4, the motorized cam rotates, thereby driving the head toward the elevation of the tape; and at the same time, the fixed cam controls the horizontal movement of the head.

Use of the rotatable cam provides the advantage that the total distance of travel of the first cam follower 90 can be closely controlled by machining the surface of the rotatable cam. Even if the cam cannot be stopped in precisely the same angular position in successive cycles, the position of the head still can be precisely controlled, because the cam can have a constant radius over the last segment of travel, say, about the last 30° of rotation. In this way, the distance to the cam's center of rotation will always be constant, regardless of the stopping position of the cam. This provides an advantage over a lead screw method of controlling the head position, since with two consecutive attempts to stop a lead screw, there can be some slight difference in rotational position which can translate into two different vertical positions of the cam follower.

Another advantage provided by the cam arrangement of this invention is that the rotatable cam can be rotated manually in the event of a power failure or in a manual-only unit. Since the cam axis of rotation 80 is parallel of the tape, the motor shaft 104 (see FIG. 5) can be located in an accessible position within the tape drive housing. By manually turning the output shaft of the motor, the cam 76 can be rotated to move the head to its retracted position so the tape cartridge can be removed from the housing.

Prior to removing the cartridge from the housing, the read/write head must be moved from the operative position shown in FIG. 4 to the retracted position shown in FIG. 3. Although other arrangements could be provided, an eject switch (not shown) can be actuated for driving the motor 66 in the reverse direction. This causes the first cam follower 90 to rotate around the cam to the shorter radius portion of the cam for causing the head support 68 and the head 30 to move vertically along the swing arm 70 away from the tape. At the same time, the second cam follower 98 follows the fixed cam 100 to move the head horizontally away from the tape, causing the swing arm 70 to rotate about the axis 74 for moving the head to the retracted position shown in FIG. 3.

Figure 6:
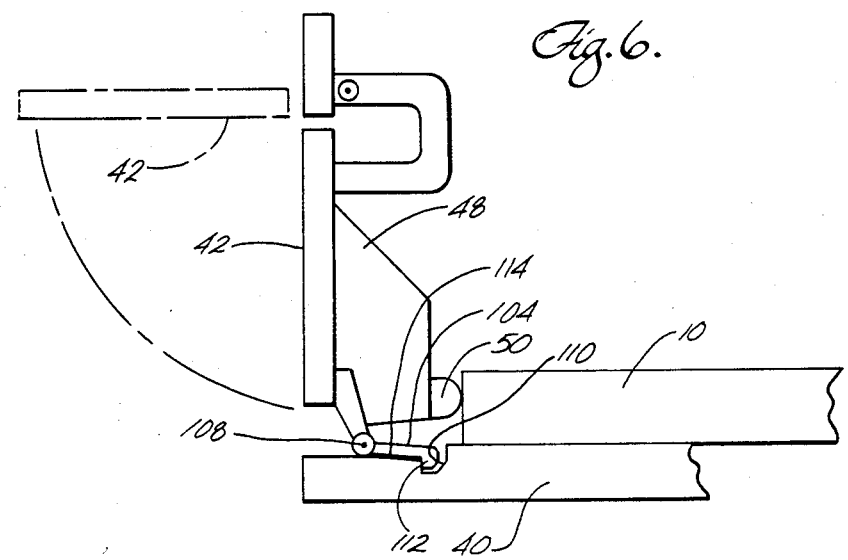
FIG. 6 is a schematic side elevation view illustrating a tape cartridge load actuation and door opening mechanism.

Once in the retracted position, the head is spaced both vertically and horizontally from the envelope of the tape cartridge so that the head will not interfere with sliding the cartridge into or out of the tape drive unit. As described above, once the cartridge is inserted most of the way into the receptacle, the rear face 44 of the cartridge contacts the ejection springs 46. The operator then closes the door 42 of the tape drive unit, causing the projecting nubs 50 on the inside of the door to contact the end face 52 of the projecting cartridge. As the door swings further toward its closed position, the nubs drive the cartridge into the loaded position. At a point during this travel, the cam 58 on the door comes in contact with the radius 60 on the interposer latch 54, causing the latch to pivot. The door control surface 64 opposite the radius comes in contact with the tape cartridge door, causing the cartridge door to swing to the open position. At this point, a pawl latch 104 carried on the door locks the door in the closed position. As shown best in FIG. 6, the pawl latch is biased toward the base 40 of the receptacle by a torsion spring 108. The base of the receptacle adjacent the door has a locking groove 110, and a detent 112 on the latch engages the locking groove for locking the door. The detent 112 rides along a ramp 114 under the spring tension and the detent latches into position in the groove when the door reaches its closed position. To open the door, the operator can reach his finger into the recess adjacent the door and pull the pawl latch laterally to disengage the latch from the locking groove.

Once the door is locked in place, the microswitch 58 is closed, which allows the head moving mechanism to be activated. During the first portion of the head mover linear stroke, a locking pin 116 (see FIG. 2) is placed behind the interposer latch 54 for locking the interposer latch in a fixed position. The locking pin is preferably carried on the head support so that as the head support moves toward the tape, the pin can be moved to its locking position adjacent the interposer latch. The locking pin prevents the interposer latch from rotating in a direction that would allow the cartridge door 20 to close. By maintaining the interposer latch in position holding the cartridge door open, the cartridge cannot be ejected while the read/write head is in the operative position. That is, if the door 42 to the tape drive is accidentally opened, the cam 58 on the door would be released from contact with the interposer latch; but the locking pin contact with the interposer latch not only keeps the cartridge door open (to avoid contact with the head) but the pin also, through the interposer latch, provides a restraint for the cartridge against the ejection springs to keep the cartridge in the stored position after the door is opened. When the head is retracted, the locking pin (which is carried on the moving head support 68) maintains contact with the interposer latch long enough to allow the head to be safely retracted from the envelope of the tape cartridge before releasing contact with the interposer latch.

What is claimed is:

1. A fail-safe mechanism for preventing ejection of a tape cartridge from a receptacle in a tape drive when a read/write head is in contact with a tape in the tape cartridge, the cartridge having a housing, and a cartridge door on the housing for opening to expose a portion of the tape for contact with the head, the cartridge door having a door tripping arm for receiving pressure contact to open the cartridge door, the fail-safe mechanism comprising: movable latch means in the receptacle of the tape drive for moving into an operative position in pressure contact with the cartridge door tripping arm when the cartridge is positioned in the tape drive receptacle; means for moving the latch means into its operative position in contact with the cartridge door tripping arm for opening the cartridge door to expose the tape for its contact with the head; a rigid locking pin for engaging the latch means in its operative position; the tape drive including means for moving the read/write head toward an operative position in contact with the tape, and in which the locking pin is carried on the head-moving means for positioning the locking pin adjacent the latch means when the head is moved to its operative position for holding the locking pin in a fixed position for maintaining its contact with the latch means for holding the cartridge door in the open position; the locking pin holding the latch means in a fixed position maintaining said pressure contact with the cartridge door tripping arm to provide a restraint that prevents ejection of the cartridge from the tape drive receptacle while the head-moving means holds the read/write head in the operative position.

2. Apparatus according to claim 1 in which the tape drive has a door to be rotated to a closed position after the cartridge is inserted in the receptacle of the tape drive; and a control surface on the tape drive door for engaging the latch means to move the latch means to open the cartridge door.

3. Apparatus according to claim 1 in which the tape drive includes means for moving the read/write head toward an operative position in contact with the tape, and in which the locking pin is carried on the head moving means for being positioned adjacent the latch means when the head is moved to its operative position.

4. Apparatus according to claim 1 in which the latch means retains the cartridge door in a partially open position when the tape is in contact with the head.

5. Apparatus according to claim 1 in which the latch means comprises a rotatable latch that rotates about a pivot pin between an inoperative position allowing passage of the tape cartridge into the receptacle and the operative position in which the latch engages the door tripping arm for holding the cartridge door open, the rotation of the latch against the fixed locking pin holding the latch in contact with the door tripping arm to provide said restraining force to prevent ejection of the cartridge from the receptacle.

6. A fail-safe receptacle for receiving a tape cartridge to be inserted in a tape drive having a receptacle door for being opened to gain access to the receptacle and for being closed when a tape cartridge is inserted in the receptacle, the tape drive also having a magnetic read/write head, the tape cartridge having a tape contained in a case, and a cartridge door on the case for opening to expose a portion of the tape for contact with the read/write head, the receptacle having latch means movable between an inoperative position allowing the cartridge to freely pass into the receptacle and an operative position in pressure contact with the cartridge door to hold the cartridge door open to expose a portion of the tape; a control surface on the receptacle door for contact with the latch means; the latch means being located with respect to the control surface so that upon moving the receptacle door to a closed position, the control surface moves the latch means into contact with the cartridge door for opening the cartridge door to expose a portion of the tape for contact with the head; a rigid locking pin for engaging the latch means in its operative position; the tape drive including means for moving the read/write head toward an operative position in contact with the tape, and in which the locking pin is carried on the head-moving means for being positioned to engage the latch means when the head is moved to its operative position for holding the locking pin in a fixed position maintaining its contact with the latch means to hold the cartridge door in the open position; the locking pin holding the latch means in a fixed position maintaining said pressure contact with the cartridge door to provide a restraint that prevents ejection of the cartridge from the tape drive receptacle while the head-moving means is in the operative position, independently of whether the control surface on the receptacle door is released from further contact with the latch means.

7. Apparatus according to claim 6 in which the latch means retains the cartridge door in a partially open position when the tape is in contact with the head.

8. Apparatus according to claim 6 in which the latch means comprises a rotable latch that rotates about a pivot pin between an inoperative position allowing passage of the tape cartridge into the receptacle and the operative position in which the latch engages the cartridge door for holding the cartridge door open, the rotation of the latch against the fixed locking pin holding the latch in contact with the door tripping arm to provide said restraining force to prevent ejection of the cartridge from the receptacle.

9. A fail-safe mechanism for preventing the ejection of a tape cartridge from a receptacle in a tape drive when a read/write head is in contact with the tape in the tape cartridge, the cartridge having a housing, and a cartridge door on the housing for opening to expose a portion of the tape for contact with the head, the cartridge door having a door tripping arm for receiving pressure contact to open the cartridge door, the fail-safe mechanism comprising: movable latch means in the tape drive receptacle for moving into an operative position in contact with the cartridge door tripping arm when the cartridge is positioned in the tape drive receptacle; means for maintaining the tape head in a retracted position while the tape cartridge is inserted into the tape drive receptacle; means for moving the latch means into its operative position in pressure contact with the cartridge door tripping arm for opening the cartridge door to expose the tape for its contact with the head; means for moving the read/write head toward an operative position in contact with the tape; and a rigid locking pin for engaging the latch means in its operative position, the locking pin being carried on the head-moving means for being positioned adjacent the latch means when the head is moved to its operative position for maintaining contact between the fixed, rigid locking pin and the latch means to hold the latch means so that it maintains pressure contact with the cartridge door tripping arm to retain the cartridge door in the open position while applying a restraint to the cartridge that prevents ejection of the cartridge from the tape drive receptacle while the head-moving means holds the head in the operative position.

10. Apparatus according to claim 9 in which the tape drive has a door to be rotated to a closed position after the cartridge is inserted in the receptacle of the tape drive, and a control surface on the tape drive door for engaging the latch means to move the latch means to open the cartridge door.

11. Apparatus according to claim 9 in which the latch means comprises a rotatable latch that rotates about a pivot pin between an inoperative position allowing passage of the tape cartridge into the receptacle and the operative position in which the latch engages the door tripping arm for holding the cartridge door open, the rotation of the latch against the fixed locking pin holding the latch in contact with the door tripping arm to provide said restraining force to prevent ejection of the cartridge from the receptacle.

12. Apparatus according to claim 9 in which the latch means retains the cartridge door in a partially open position when the tape is in contact with the head.

13. A fail-safe mechanism for preventing ejection of a tape cartridge from a receptacle in a tape drive when a read/write head is in contact with a tape in the tape cartridge, the cartridge having a housing, and a cartridge door on the housing for opening to expose a portion of the tape for contact with the head, the cartridge door having a door tripping arm for receiving pressure contact to open the cartridge door, the fail-safe mechanism comprising: movable latch means in the receptacle of the tape drive for moving into an operative position in pressure contact with the cartridge door tripping arm when the cartridge is positioned in the tape drive receptacle; means for moving the latch means into its operative position in contact with the cartridge door tripping arm for opening the cartridge door to expose the tape for its contact with the head; a rigid locking pin for engaging the latch means in its operative position; and means for holding the locking pin in a fixed position for maintaining its contact with the latch means for holding the cartridge door in the open position, the latch means comprising a rotatable latch that rotates about a pivot pin between an inoperative position allowing passage of the tape cartridge into the receptacle and the operative position in which the latch engages the door tripping arm for holding the cartridge door open, the locking pin holding the latch in a fixed position rotated into contact with the door tripping arm to provide a restraint that prevents ejection of the cartridge from the tape drive receptacle while the tape is in contact with the read/write head.

* * * * *